(12) United States Patent
Al Fadhli (10) Patent No.: US 9,376,218 B2
(45) Date of Patent: Jun. 28, 2016

(54) EMERGENCY AIRCRAFT LANDING SYSTEMS AND METHODS

(75) Inventor: Abdullah Abdulaziz A. Al Fadhli, Riyadh (SA)

(73) Assignee: King Saud University, Riyadh (SA)

( * ) Notice: Subject to any disclaimer, the term of this patent is extended or adjusted under 35 U.S.C. 154(b) by 494 days.

(21) Appl. No.: 12/973,884

(22) Filed: Dec. 20, 2010

(65) Prior Publication Data

US 2012/0158221 A1 Jun. 21, 2012

(51) Int. Cl.
*B64F 1/00* (2006.01)
*B64F 1/10* (2006.01)
*B64F 1/02* (2006.01)
*G05D 1/00* (2006.01)

(52) U.S. Cl.
CPC ... *B64F 1/10* (2013.01); *B64F 1/02* (2013.01); *G05D 1/0083* (2013.01)

(58) Field of Classification Search
USPC .......... 701/16; 244/110, 110 C, 110 E, 110 F, 244/114 R
See application file for complete search history.

(56) References Cited

U.S. PATENT DOCUMENTS

| | | | | | |
|---|---|---|---|---|---|
| 3,567,159 | A * | 3/1971 | Klein | ........................ | B64F 1/36 244/114 R |
| 5,470,033 | A * | 11/1995 | Tsai | ........................ | B64F 1/10 104/245 |
| 6,394,391 | B1 * | 5/2002 | Lo | ........................... | B64F 1/10 244/110 A |
| 7,871,037 | B2 * | 1/2011 | Kassai | ..................... | B64F 1/02 244/110 E |
| 2008/0308673 | A1 * | 12/2008 | Liu | ........................ | B64F 1/025 244/110 R |

* cited by examiner

*Primary Examiner* — Adam Tissot
(74) *Attorney, Agent, or Firm* — Hauptman Ham, LLP (57) ABSTRACT

Emergency aircraft landing systems and methods are described. In one aspect, an emergency landing apparatus includes a support structure for a fuselage and wings of an aircraft and a control system. The control system includes a processor and a memory containing computer program instructions executable by the processor. Execution of the computer program instructions causes an interface on the aircraft to exchange information between an aircraft guidance and control system on the aircraft and the control system. The computer program instructions further synchronize the speed and position of the emergency aircraft landing apparatus on a runway with the speed and flight path of the aircraft.

23 Claims, 9 Drawing Sheets

EMERGENCY AIRCRAFT LANDING SYSTEMS AND METHODS

BACKGROUND

Many types of aircraft have retractable landing gear that is retracted after take-off and extended prior to landing. Retractable landing gear provides improved aerodynamics of the airplane by reducing drag caused by fixed landing gear. However, retractable landing gear may occasionally malfunction. For example, the mechanisms that extend the retractable landing gear may not work properly such that a portion of the landing gear is not fully extended. In most situations, an airplane cannot land properly unless all landing gear components are fully extended.

If an airplane's landing gear does not extend properly prior to landing, an emergency landing procedure is implemented. In some situations, fire suppression foam or other materials are sprayed onto the runway prior to an emergency landing. In other situations, the airplane lands on an untreated runway with the damaged landing gear. In either case, the airplane typically experiences significant damage and the passengers on the airplane may be injured due to the direct contact of the aircraft fuselage and/or wings with the runway. Thus, it is desirable to provide emergency landing procedures that allow an airplane with malfunctioning landing gear to land with reduced damage to the airplane and reduced risk of injury to the passengers.

SUMMARY

The described systems and methods relate to an emergency aircraft landing structure and the operation thereof. A specific emergency aircraft landing apparatus includes a support structure for a fuselage and wings of an aircraft as well as a control system. The control system has a processor and a memory containing computer program instructions executable by the processor. Executing the computer program instructions causes an interface on the aircraft to exchange information between an aircraft guidance and control system on the aircraft and the control system. The computer program instructions also synchronize the speed and position of the emergency aircraft landing apparatus on a runway with the speed and flight path of the aircraft.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

The Figures discussed herein are not necessarily drawn to scale. Some dimensions may be changed to better illustrate specific details or relationships.

DETAILED DESCRIPTION

Overview

The emergency aircraft landing systems and methods described herein utilize a structure that allows an airplane with malfunctioning landing gear to land on a runway with reduced damage to the airplane and reduced injury to the passengers. In particular, the structure provides a moveable landing "platform" that prevents the airplane from contacting the surface of the runway. The structure is of sufficient size and strength to support the weight of the airplane during an emergency landing procedure. The structure is also capable of being accelerated and maneuvered to match the landing speed and landing flight path of the airplane. In particular implementations, a single emergency aircraft landing system is used in multiple emergency landing procedures.

Particular examples discussed herein include specific structural configurations and component placements. However, the present invention is capable of implementation in a variety of different structural configurations and arrangements of components. The terms "airplane" and "aircraft" are used herein to refer to any type of vehicle or device capable of flying and landing on a runway or other surface.

An Exemplary Emergency Aircraft Landing System

Figure 1:
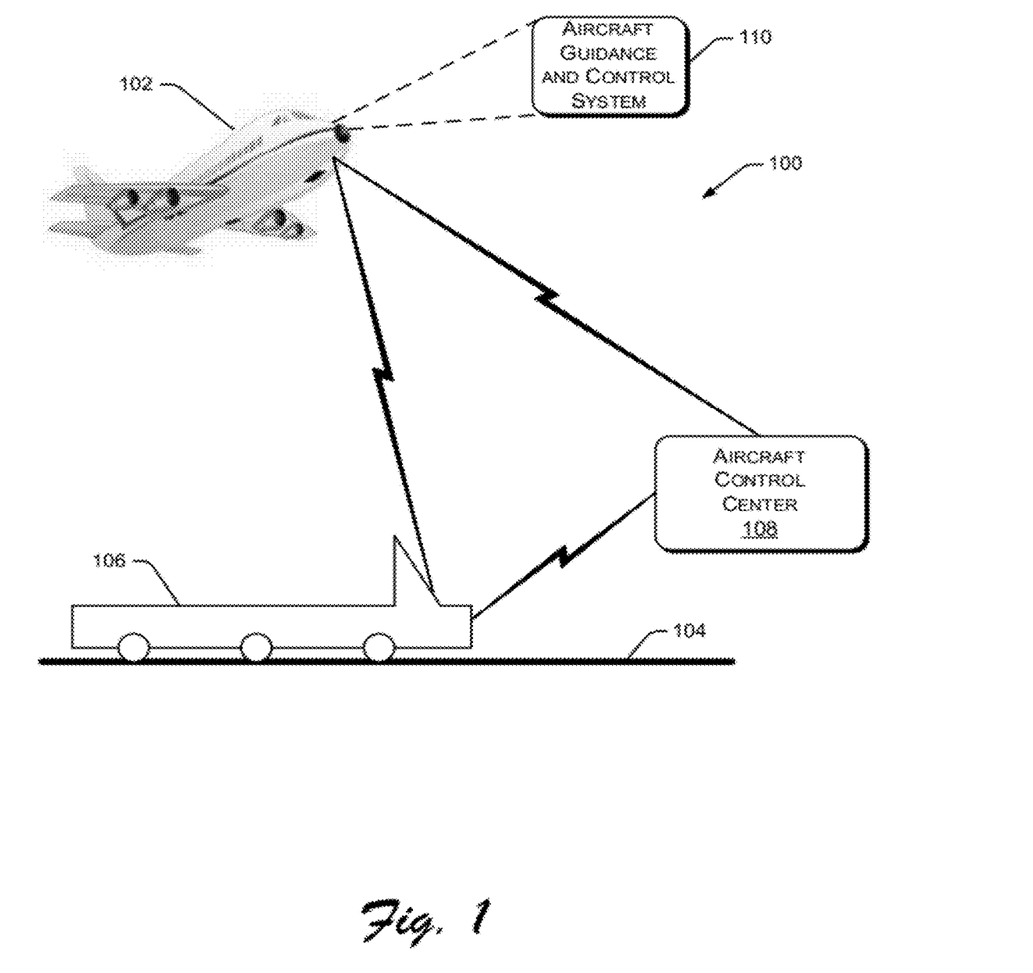
FIG. 1 shows an exemplary environment for implementing an emergency landing procedure, according to one embodiment.

FIG. 1 shows an exemplary environment 100 for implementing an emergency landing procedure, according to one embodiment. As shown in FIG. 1, an airplane 102 is preparing for landing on a runway 104. In environment 100, airplane 102 has a problem with at least a portion of the landing gear such that the landing gear is not fully extended for landing. In this situation, an emergency landing procedure is performed because airplane 102 cannot initiate a conventional landing due to its malfunctioning landing gear. The emergency landing procedure includes the use of an emergency landing structure 106, which provides a landing "platform" that prevents the airplane from contacting the surface of runway 104.

Emergency landing structure 106 includes multiple wheels and other components that allow the structure to be maneuvered into alignment with the flight path of airplane 102. As discussed below, emergency landing structure 106 also includes one or more motors, propulsion systems, and the like to maneuver and accelerate the structure for proper alignment under airplane 102 as it lands on the structure. Emergency landing structure 106 communicates with airplane 102 and an aircraft control center 108 to determine the proper positioning of the emergency landing structure. For example, emergency landing structure 106 may communicate with aircraft guidance and control system 110 to obtain various information about airplane 102, such as airspeed, altitude, flight path, fuselage pitch and roll information, and the like. Alternatively, emergency landing structure 106 may receive information about airplane 102 from another source that is in communication with the airplane, such as aircraft control center 108. In a particular embodiment, aircraft guidance and control system 110 is an autopilot system.

The position and speed of emergency landing structure 106 is continually monitored and updated to maintain proper speed and alignment with airplane 102. This maintaining of proper speed and alignment with airplane 102 is also referred to as "synchronizing" emergency landing structure 106 with the airplane. Additional details regarding emergency landing structure 106 and the control of that structure are discussed herein. In the example of FIG. 1, emergency landing structure 106 is operated on runway 104. In other environments, emergency landing structure 106 is operated on any surface that allows the structure to synchronize with airplane 102 and support the weight of the airplane during the emergency landing procedure.

Figure 2:
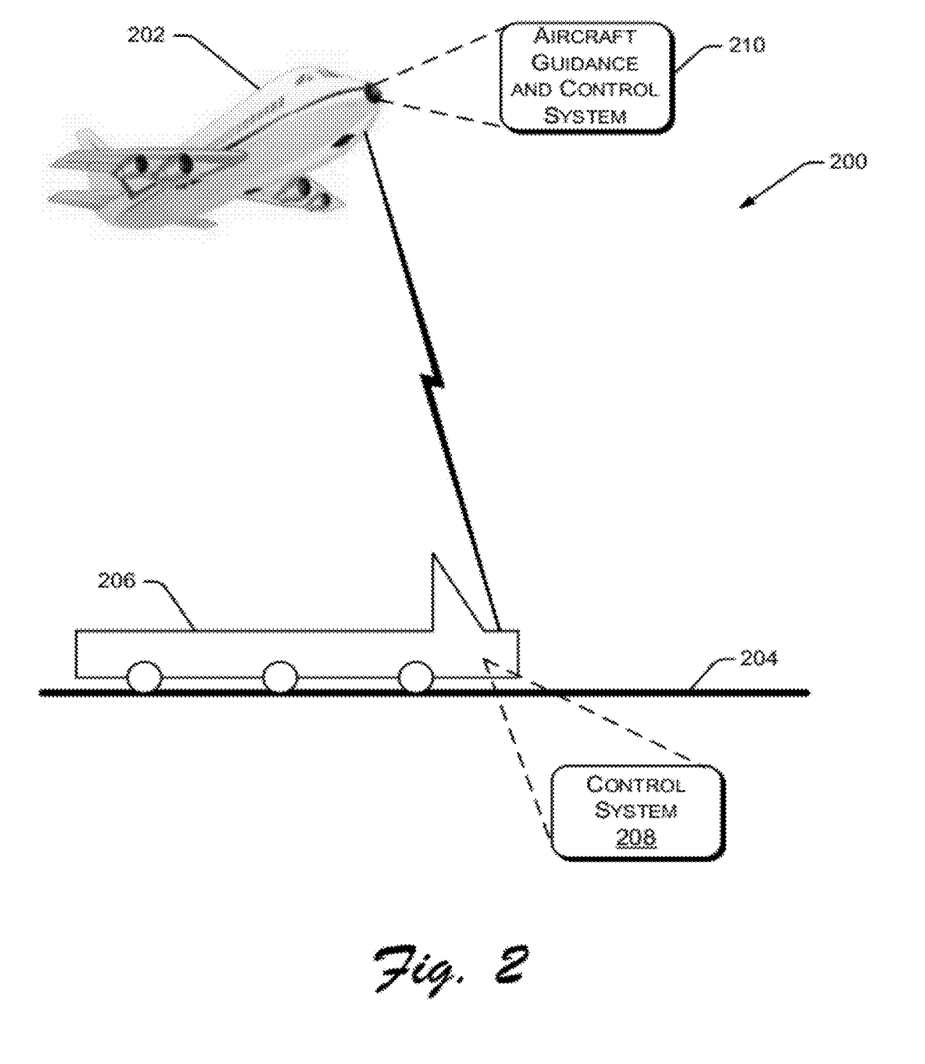
FIG. 2 shows another exemplary environment for implementing an emergency landing procedure, according to one embodiment.

FIG. 2 shows another exemplary environment 200 for implementing an emergency landing procedure, according to one embodiment. As shown in FIG. 2, an airplane 202 is preparing to land on a runway 204. In environment 200, airplane 202 has a problem with at least a portion of the landing gear such that the landing gear is not fully extended for landing. An emergency landing procedure is initiated using an emergency landing structure 206, which provides a landing platform for airplane 202. Emergency landing structure 206 includes a control system 208, which communicates directly with airplane 202 to maintain a proper speed and alignment of the structure with the airplane. In a particular embodiment, emergency landing structure 206 communicates with an aircraft guidance and control system 210 to obtain various information about airplane 202, such as airspeed, altitude, flight path, fuselage pitch and roll information, and the like. Additional details regarding control system 208 and its operation are discussed below.

Figure 3:
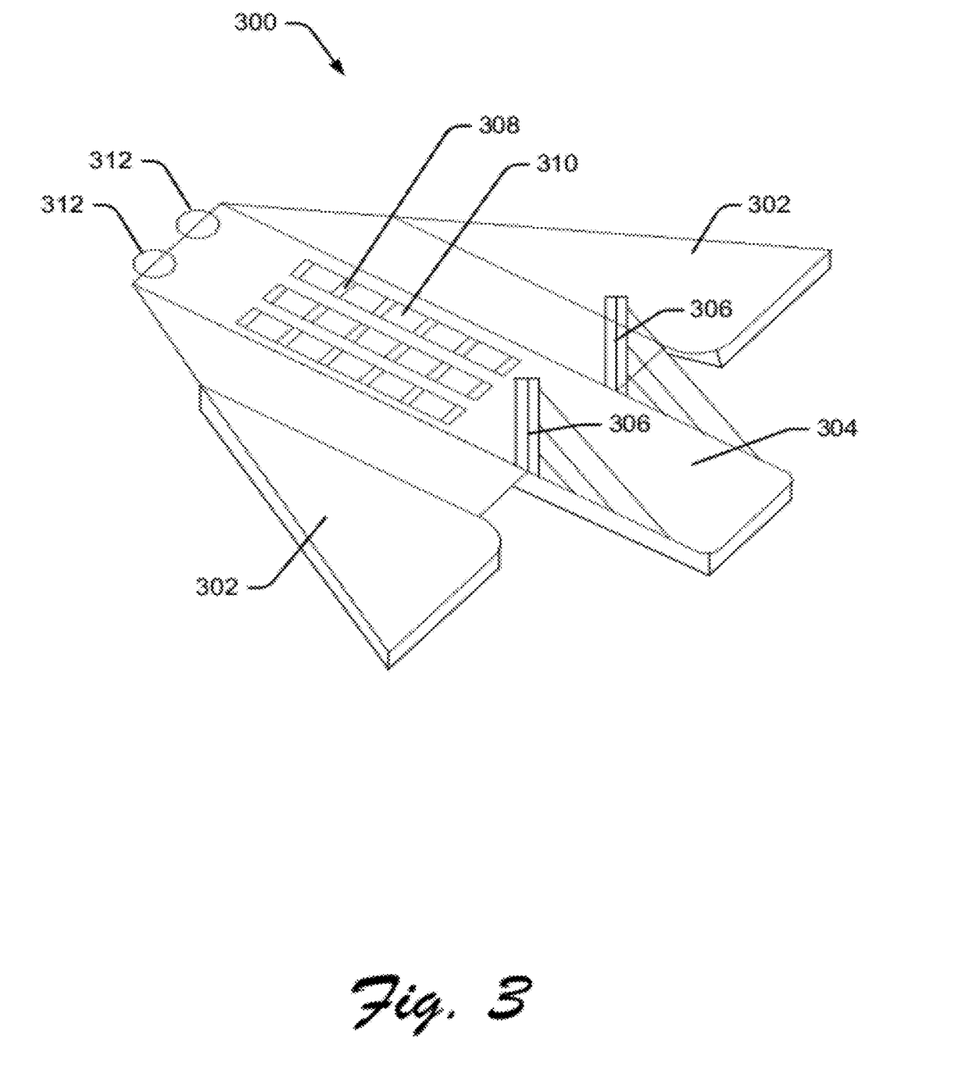
FIG. 3 illustrates a top perspective view of an exemplary emergency landing structure, according to one embodiment.

FIG. 3 illustrates a top perspective view of an exemplary emergency landing structure 300, according to one embodiment. Emergency landing structure 300 includes a pair of side supports 302 that support at least a portion of an airplane's wings when positioned in the structure. Emergency landing structure 300 also includes a center support 304 that supports at least a portion of an airplane's fuselage. A pair of vertical arms 306 extends upward from the sides of center support 304. Vertical arms 306 act as a guide to assist the pilot of the airplane in properly positioning the fuselage on emergency landing structure 300.

Emergency landing structure 300 also includes multiple cylinders 308 and cushions 310 positioned within center support 304. In a particular embodiment, cylinders 308 and cushions 310 are manufactured using a durable rubber compound. In that embodiment, cylinders 308 are installed such that the cylinders rotate in one direction—toward the front of emergency landing structure 300. As oriented in FIG. 3, the "front" of emergency landing structure 300 is toward the right side of FIG. 3, in the general area of vertical arms 306. This unidirectional rotation of cylinders 308 allows the airplane's fuselage to slide forward with respect to emergency landing structure 300 for proper positioning of the fuselage. Cylinders 308 prevent backward movement of the fuselage to help maintain the fuselage position within emergency landing structure 300 as the airplane and structure decelerate. Cushions 310 protect the bottom of the fuselage as it contacts emergency landing structure 300 and provide friction between the fuselage and the structure to reduce the likelihood of the fuselage slipping once it is positioned on the structure.

Emergency landing structure 300 can be manufactured from a variety of materials, such as aluminum, steel, or any other material or combination of materials. In a particular embodiment, emergency landing structure 300 is constructed using a framework of support elements rather than a solid structure. That framework minimizes the weight of emergency landing structure 300 while providing the structural integrity necessary to withstand the weight of the landing airplane.

In addition to cushions 310, other portions of emergency landing structure 300 may be covered with rubber or similar material to minimize damage as the airplane contacts the structure. In particular embodiments, rubber panels are placed on emergency landing structure 300 in locations likely to come in contact with the fuselage or wings of the airplane.

Emergency landing structure 300 further includes one or more lights 312 to assist the pilot of the airplane in making visual contact with the structure and positioning the airplane onto the structure. Although FIG. 3 shows two lights 312 positioned at the rear of emergency landing structure 300, alternate embodiments may include any number of lights positioned at any number of locations on the structure. Additionally, lights 312 may be of any color or multiple colors.

The dimensions associated with emergency landing structure 300 will vary depending on the size of the aircraft using the structure. Specific emergency landing structures 300 can be designed to accommodate multiple aircraft models that fall within a particular range of sizes and weights.

In a particular embodiment of emergency landing structure 300, the structure is operated from a remote location and no personnel are in direct contact with the structure. In other embodiments, an operator is present in a cabin or other portion of emergency landing structure 300 for the purposes of controlling the structure, communicating with the landing airplane, and so forth.

Figure 4:
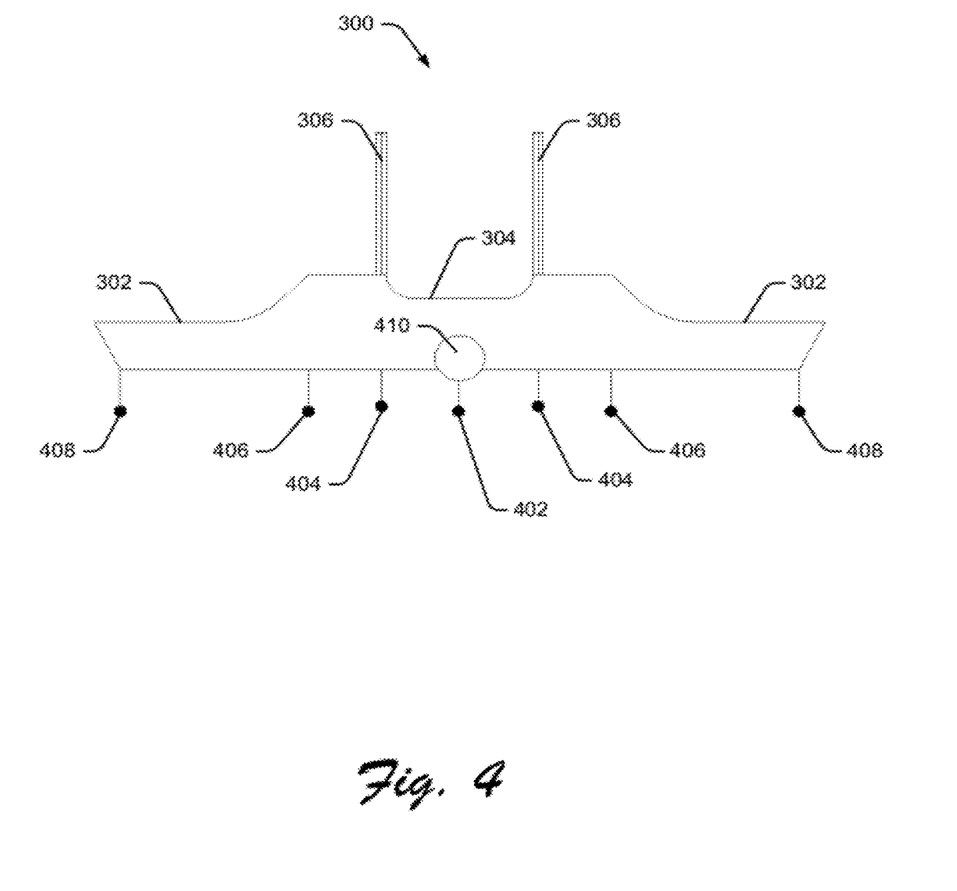
FIG. 4 illustrates a front view of the exemplary emergency landing structure shown in FIG. 3, according to one embodiment.

FIG. 4 illustrates a front view of the exemplary emergency landing structure shown in FIG. 3, according to one embodiment. As shown in FIG. 4, emergency landing structure 300 includes multiple wheels 402, 404, 406, and 408 to support the structure and allow for maneuvering the structure on the runway or other surface. Wheels 402-408 are located at different positions on emergency landing structure 300 to provide weight distribution across the multiple wheels. In a particular embodiment, wheels 402-408 are mounted to emergency landing structure 300 using a hydraulic shock absorber to dissipate some of the forces applied to the structure by a landing airplane. These hydraulic shock absorbers are similar to the systems used with airplane landing gear.

One or more wheels 402-408 include a steering mechanism that allows the wheel to turn, thereby changing the position or direction of movement of emergency landing structure 300. One or more wheels 402-408 also include a brake mechanism to slow or stop the movement of emergency landing structure 300. The brake mechanism is used to adjust the speed of emergency landing structure 300 during an emergency landing procedure and to stop the structure after an airplane has landed on the structure. Additionally, brake mechanisms can be attached to multiple wheels 402-408 to permit steering of emergency landing structure 300 using a differential braking technique. Differential braking applies different braking forces to different wheels causing emergency landing structure 300 to rotate (or turn) in the direction of the greater braking force.

In a particular embodiment, wheel 402 is located near the front of emergency landing structure 300 and wheels 404 are located near the rear of the structure. In that embodiment, wheels 406 are positioned in the middle of emergency landing structure 300 and wheels 408 are located near the outer edges of side supports 302. Alternate embodiments may include any number of wheels arranged in any configuration capable of supporting the weight of emergency landing structure 300 as well as the forces applied by an airplane landing on the structure.

Emergency landing structure 300 also includes a propulsion device 410, such as a jet engine, to control the speed of the structure as it moves on the runway or other surface. Particular embodiments may include multiple propulsion devices 410 to power emergency landing structure 300 and, in some situations, assist with the steering and maneuvering of the structure. For example, a propulsion device 410 can be mounted near the outer edges of both side supports 302. In this example, application of different forces to the propulsion devices 410 produce rotational forces on emergency landing structure 300, resulting in a "steering" action. In particular embodiments, propulsion device 410 is capable of a "reverse thrust" mode of operation that assists with the slowing or stopping of emergency landing structure 300 after an airplane has landed on the structure.

In alternate embodiments, one or more motorized wheels or other drive mechanisms are used instead of, or in addition to, propulsion device 410. For example, a motorized wheel is used to maneuver emergency landing structure 300 at slow speeds, such as moving the structure from a storage location to a runway for use in an emergency landing procedure. In this example, propulsion device 410 accelerates emergency landing structure 300 up to a speed that matches the landing speed of an approaching airplane.

Figure 5:
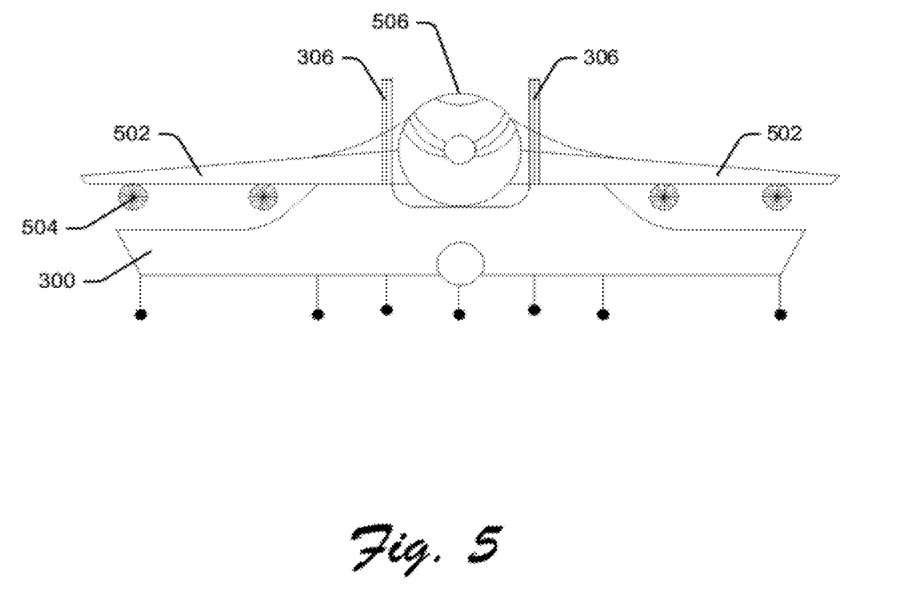
FIG. 5 illustrates a front view of the exemplary emergency landing structure shown in FIG. 3 after an airplane has landed in the structure, according to one embodiment.

FIG. 5 illustrates a front view of the exemplary emergency landing structure shown in FIG. 3 after an airplane 506 has landed on the structure, according to one embodiment. Airplane 506 is positioned such that the front of the airplane fuselage is located between two vertical arms 306 and airplane wings 502 extend out over the sides of emergency landing structure 300. In the example of FIG. 5, the outer sides of emergency landing structure 300 have recessed portions that provide space for airplane engines 504. This arrangement allows airplane 506 to be supported by the fuselage and the portions of wings 502 closest to the fuselage. By avoiding direct contact with the outer portion of wings 502 and engines 504, the potential for damage to the airplane wings and engines is reduced.

Emergency landing structure 300 also includes one or more mechanisms that adjust the pitch and lateral angle of the structure to correspond to the pitch and roll information received from an approaching airplane. These mechanisms allow emergency landing structure 300 to more closely align with the orientation of the landing airplane and better support the airplane as it lands on the structure. The mechanisms that adjust the pitch and lateral angle of the structure include, for example, one or more hydraulic adjustments to structural components.

Figure 6:
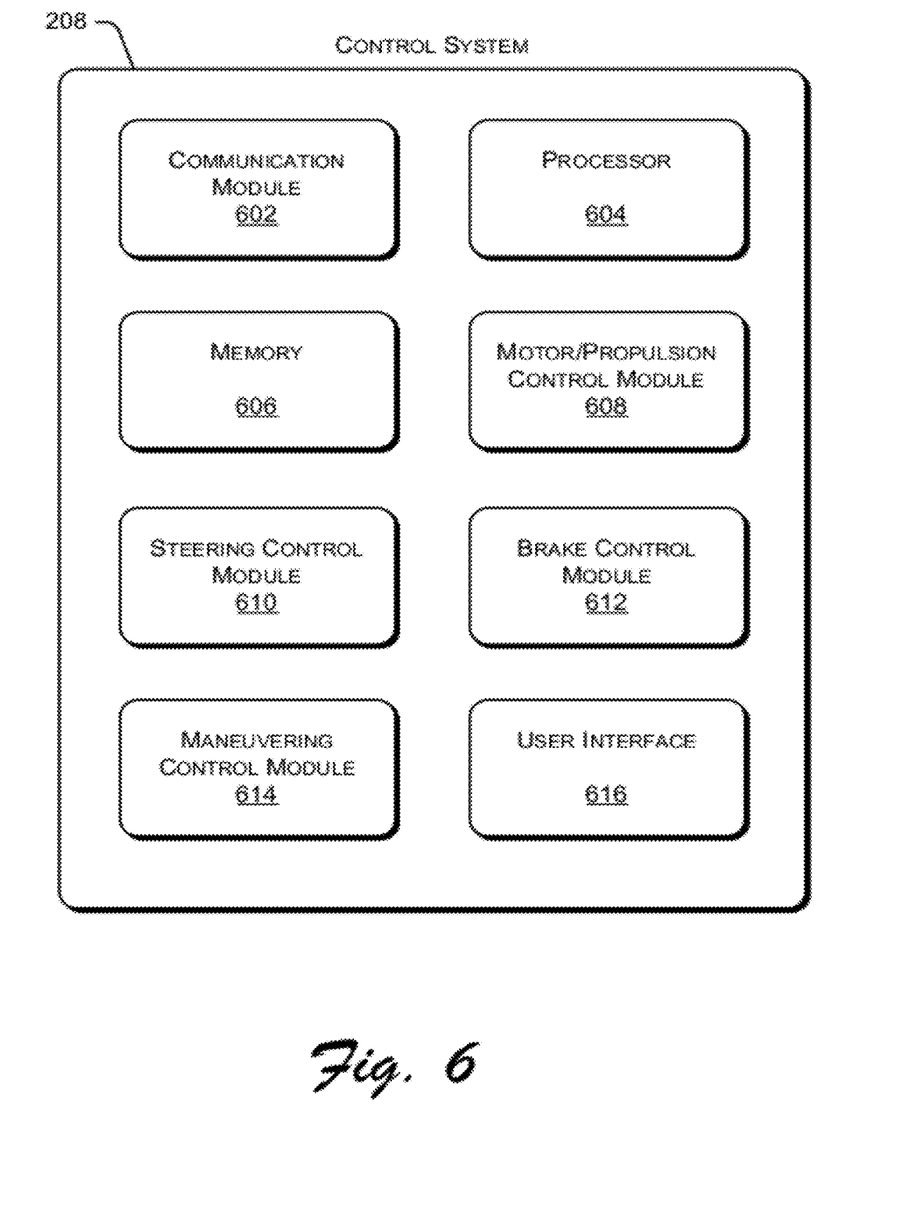
FIG. 6 is a block diagram illustrating various components of a control system, according to one embodiment.

FIG. 6 is a block diagram illustrating various components of control system 208, according to one embodiment. As mentioned above, control system 208 is part of the emergency landing structure, and communicates with an airplane and/or an aircraft control center to obtain information regarding the speed, flight path, and other data related to the airplane. This information is used by control system 208 to maintain a proper speed and alignment of the emergency landing structure with the airplane during an emergency landing procedure.

Control system 208 includes a communication module 602, a processor 604, and a memory 606. Communication module 602 allows control system 208 to communicate with other devices and systems, such as an airplane and an aircraft control center. Communication module 602 may communicate data via a wired or wireless communication link using any data communication protocol. Processor 604 executes various instructions to implement the functionality provided by control system 208. Memory 606 stores these instructions, as well as other data used by processor 604 and other modules contained in control system 208.

Control system 208 also includes a motor/propulsion control module 608 that controls one or more motorized wheels, propulsion devices, and similar components associated with the emergency landing structure. Motor/propulsion control module 608 controls the motorized wheels and propulsion devices based on input signals received from other components in control system 208, such as communication module 602 and processor 604. A steering control module 610 controls one or more steering mechanisms in the emergency landing structure, such as steerable wheels and propulsion devices. A brake control module 612 controls one or more braking mechanisms in the emergency landing structure, such as wheel brakes and propulsion devices with reverse thrust capability.

The emergency landing structure also includes a maneuvering control module 614, which controls or manages the operation of multiple systems to maneuver the emergency landing structure on a runway or other surface. Maneuvering control module 614 controls, for example, the speed, location, and direction of movement of the emergency landing structure. Maneuvering control module 614 also controls adjustments to the pitch and lateral angling of the emergency landing structure to synchronize the structure with the airplane. A user interface 616 allows ground control personnel, maintenance personnel, and other users to interact with the various components of control system 208. In certain embodiments, user interface 616 also allows a user to interact with control system 208 from a remote location. In these embodiments, the remote user accesses user interface 616 by sending signals via communication module 602. User interface 616 allows a user to control one or more functions of the emergency landing structure, such as the propulsion, steering, and braking functions performed by various devices associated with the structure.

An Exemplary Procedure for Emergency Aircraft Landing

Figure 7:
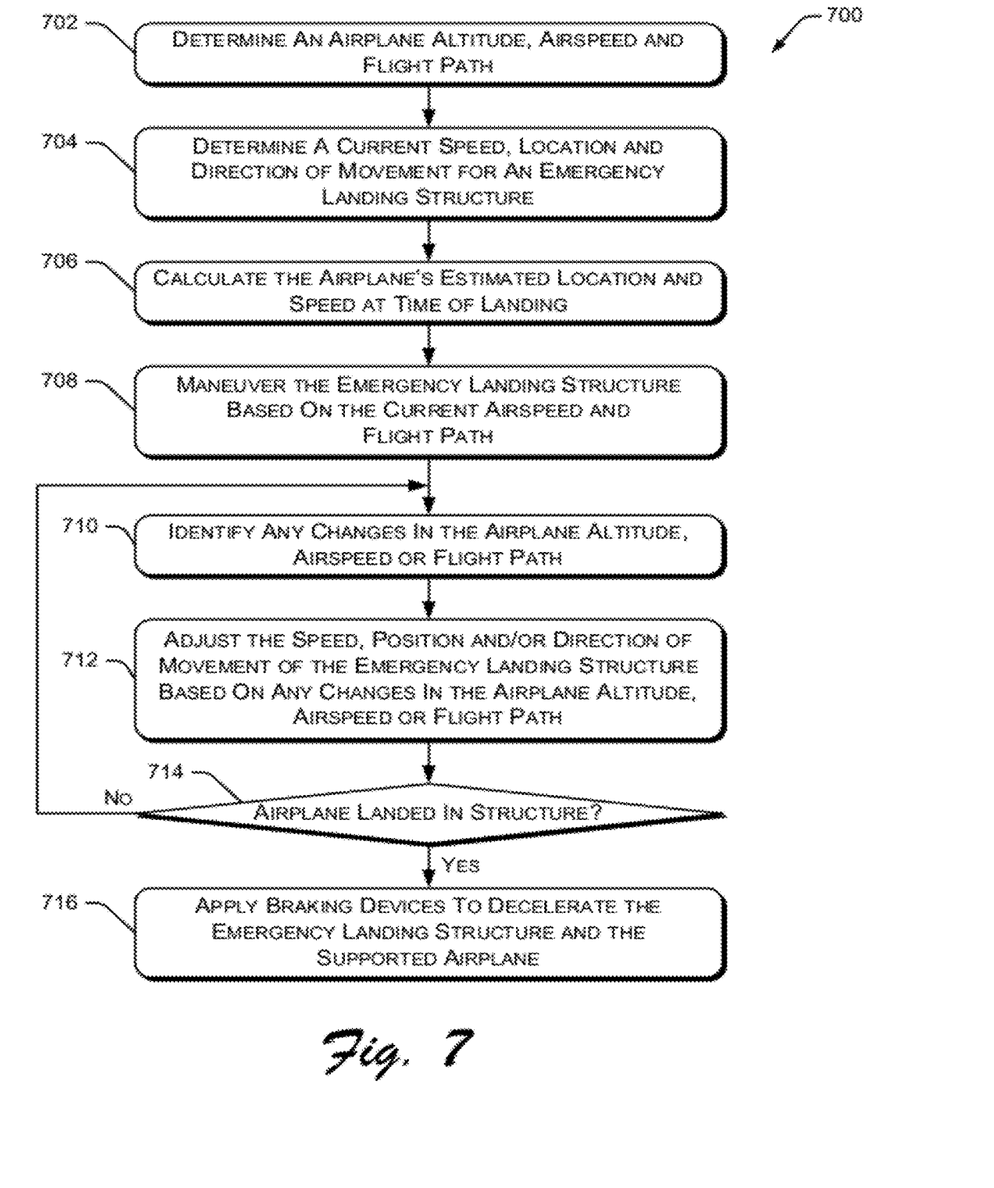
FIG. 7 is a flow diagram illustrating an example procedure for aligning an emergency landing structure with an airplane, according to one embodiment.

FIG. 7 is a flow diagram illustrating an example procedure 700 for aligning an emergency landing structure with an airplane, according to one embodiment. Initially, procedure 700 determines the altitude, airspeed, and flight path of an airplane making an emergency landing (block 702). The procedure then determines a current speed, location, and direction of movement for an emergency landing structure (block 704). In a particular embodiment, the current speed, location, and direction of movement are determined by a GPS (Global Positioning System) device. In other embodiments, this information is received from the aircraft guidance and control system on the airplane (e.g., received by an emergency landing structure via an interface to the aircraft guidance and control system). Alternate embodiments may use any type of device or system capable of determining the speed, location, and direction of movement associated with the emergency landing structure.

Procedure 700 continues by calculating the airplane's estimated location and speed at time of landing (block 706). The emergency landing structure then is maneuvered based on the current airspeed and flight path of the airplane (block 708). In a particular embodiment, the direction of motion of the emergency landing structure is adjusted to match the flight path of the airplane, and the speed of the structure is adjusted to ensure that the structure arrives at the estimated landing location simultaneously with the airplane.

The procedure continues to monitor the airplane and identifies any changes in the airplane altitude, airspeed, or flight path (block 710). This monitoring can be performed automatically by the control system in the emergency landing structure, by a user in the airplane (such as the pilot), or by another system located remotely from the emergency landing structure.

The speed, position, and/or direction of movement of the emergency landing structure are adjusted based on any changes in the airplane's altitude, airspeed, or flight path (block 712). These adjustments also can be made automatically by the control system in the emergency landing structure, by a pilot or other user in the airplane, or by another system located remotely from the emergency landing structure. In a particular implementation in which the maneuvering of the emergency landing structure is performed by a user in the airplane, the user is presented with visual and/or audio information regarding the speed, position, and direction of the emergency landing structure. Based on the presented information, the user makes necessary adjustments to the emergency landing structure and/or the airplane to maintain synchronization between the emergency landing structure and the airplane.

If the airplane has not yet landed in the emergency landing structure (block 714), the procedure returns to block 710 to continue monitoring the airplane for any changes in the airplane altitude, airspeed, or flight path. If the airplane has landed in the emergency landing structure, braking devices on the structure are applied to decelerate the structure and the supported airplane (block 716).

In a specific implementation, the control system in the emergency landing structure initially handles the synchronization of the structure with the airplane. As the airplane approaches the emergency landing structure, a user on the airplane may take control of the maneuvering of the structure until the airplane has landed on the structure. For example, the pilot of the airplane can override the operation of the control system in the emergency landing structure, thereby allowing the pilot to control both the airplane and the emergency landing structure.

Figure 8:
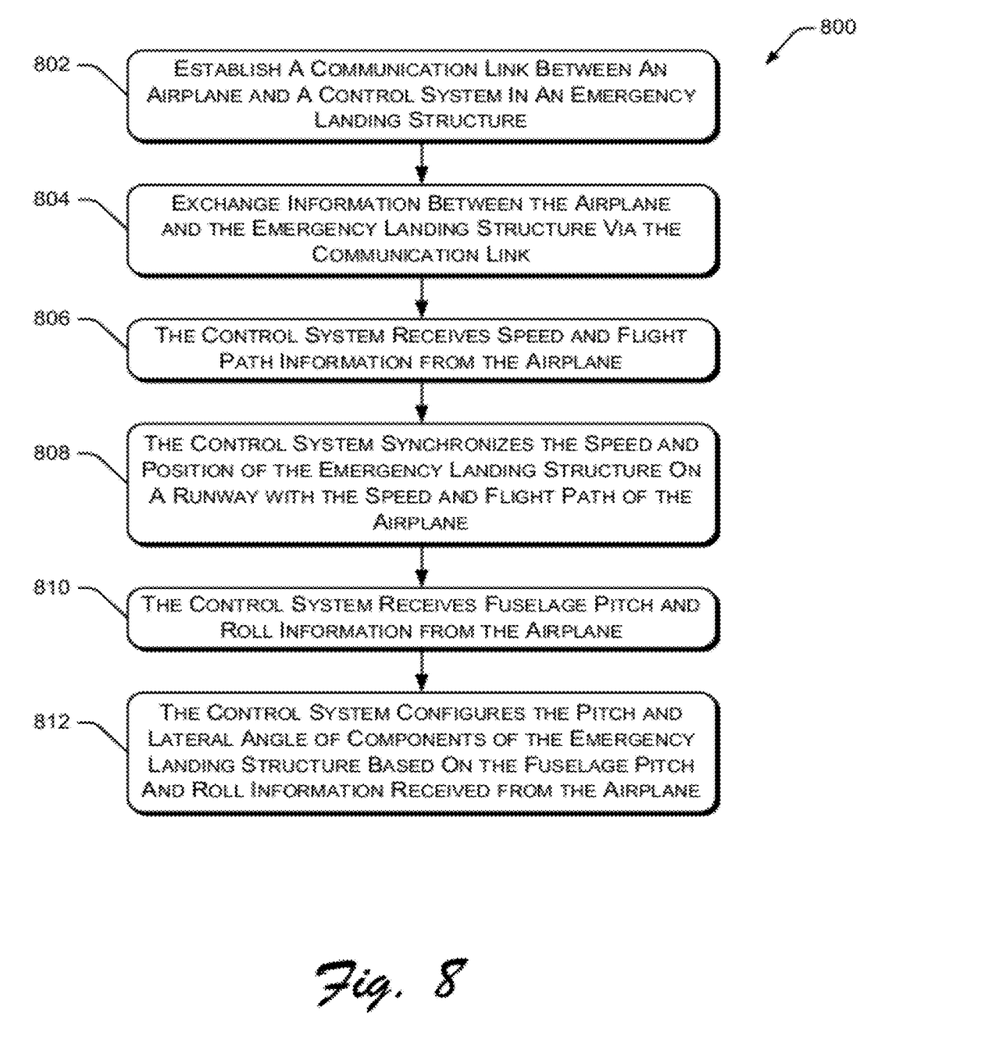
FIG. 8 is a flow diagram illustrating an example procedure for communicating information between an emergency landing structure and an airplane, according to one embodiment.

FIG. 8 is a flow diagram illustrating an example procedure 800 for communicating information between an emergency landing structure and an airplane, according to one embodiment. Initially, the procedure establishes a communication link between an airplane and a control system in an emergency landing structure (block 802). The airplane and the emergency landing structure exchange information via the communication link (block 804). Examples of information exchanged include airspeed of the airplane, altitude, fuselage pitch and roll information, flight path angle, airplane glide slope, wind speed, and flight path direction.

Procedure 800 continues as the control system receives speed and flight path information from the airplane (block 806). The control system then synchronizes the speed and position of the emergency landing structure on a runway with the speed and flight path of the airplane (block 808). The control system also receives fuselage pitch and roll information from the airplane (block 810). Based on the fuselage pitch and roll information, the control system configures the pitch and lateral angle of components of the emergency landing structure based on the fuselage pitch and roll information received from the airplane (block 812).

Particular embodiments of the emergency landing structure discussed herein can be configured as an emergency landing "simulator" used to simulate or practice emergency landing procedures. In this situation, the emergency landing simulator may not have the structural strength to support the landing aircraft. However, since the structure is used as a simulator, the airplane does not actually land on the structure. This simulator structure allows pilots, operators, and other users to practice emergency landing procedures using a similar structure such that they are proficient in the case of a real emergency landing procedure using a "non-simulator" emergency landing structure.

Figure 9:
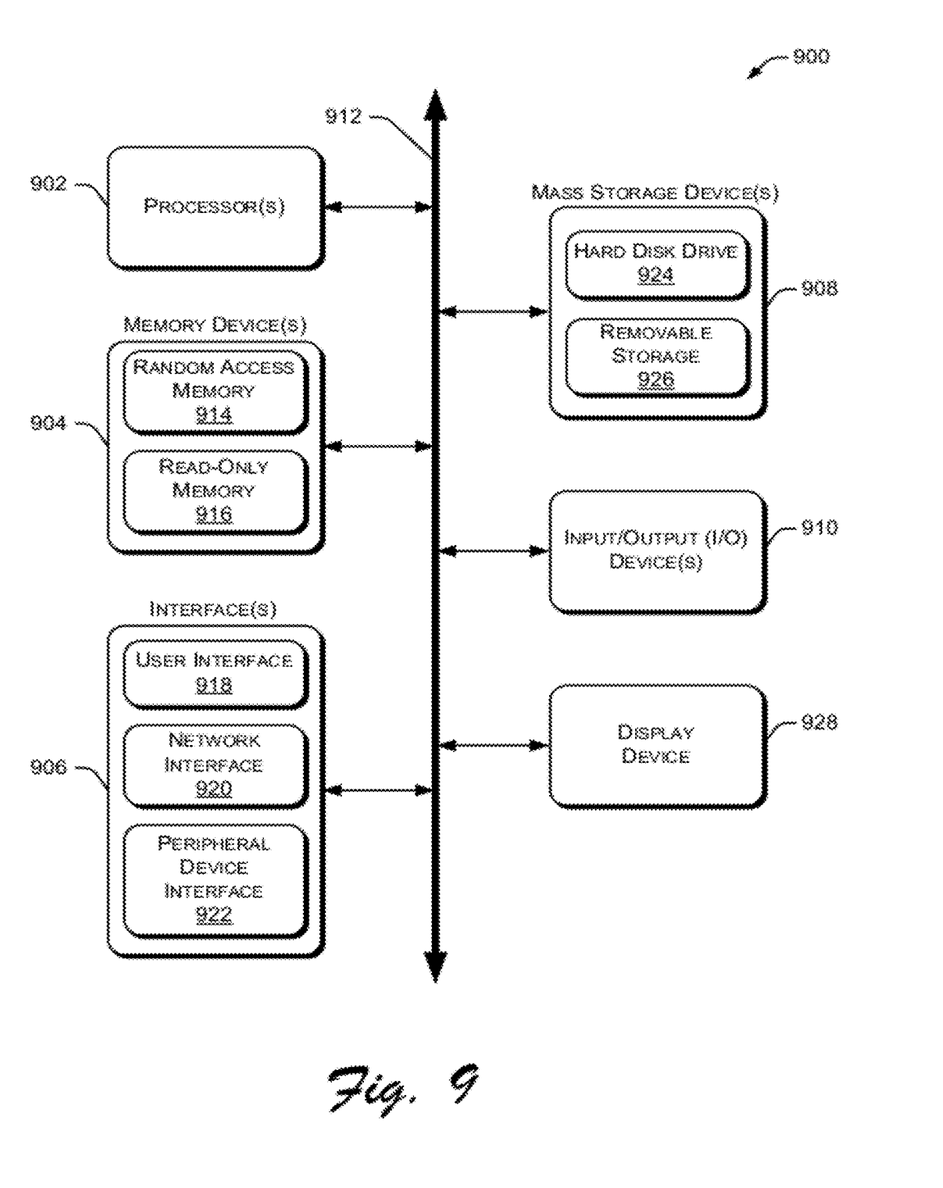
FIG. 9 is a block diagram illustrating an example computing device, according to one embodiment.

FIG. 9 is a block diagram illustrating an example computing device 900. Computing device 900 may be used to perform various procedures, such as those discussed herein. Computing device 900 can function as a server, a client, a worker node, or any other computing entity. Computing device 900 can be any of a wide variety of computing devices, such as a desktop computer, a notebook computer, a server computer, a handheld computer, and the like.

Computing device 900 includes one or more processor(s) 902, one or more memory device(s) 904, one or more interface(s) 906, one or more mass storage device(s) 908, one or more Input/Output (I/O) device(s) 910, and a display device 928, all of which are coupled to a bus 912. Processor(s) 902 include one or more processors or controllers that execute instructions stored in memory device(s) 904 and/or mass storage device(s) 908. Processor(s) 902 also may include various types of computer-readable media, such as cache memory.

Memory device(s) 904 include various computer-readable media, such as volatile memory (e.g., random access memory (RAM)) 914 and/or nonvolatile memory (e.g., read-only memory (ROM)) 916. Memory device(s) 904 may also include rewritable ROM, such as Flash memory.

Mass storage device(s) 908 include various computer readable media, such as magnetic tapes, magnetic disks, optical disks, solid state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, lenses, CCDs or other image capture devices, and the like.

Display device 928 includes any type of device capable of displaying information to one or more users of computing device 900. Examples of display device 928 include a monitor, display terminal, video projection device, and the like.

Interface(s) 906 include various interfaces that allow computing device 900 to interact with other systems, devices, or computing environments. Example interface(s) 906 include any number of different network interfaces 920, such as interfaces to local area networks (LANs), wide area networks (WANs), wireless networks, and the Internet. Other interfaces include user interface 918 and peripheral device interface 922.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Conclusion

Although the emergency aircraft landing systems and methods have been described in language specific to structural features and/or methodological operations or actions, it is understood that the implementations defined in the appended claims are not necessarily limited to the specific features or actions described. Rather, the specific emergency aircraft landing features and operations are disclosed as exemplary forms of implementing the claimed subject matter.

The invention claimed is:

1. An emergency aircraft landing apparatus, the apparatus comprising: a support structure for a fuselage and wings of an aircraft; and a control system, the control system comprising:
   a processor; and
   a memory operatively coupled to the processor, the memory comprising computer program instructions executable by the processor to perform operations comprising:
      automatically coupling to an exposed interface on the aircraft to initiate a two-way exchange of information between an automated Aircraft Guidance and Control System ("AGCS") onboard the aircraft, and the control system;
      synchronizing, responsive to the two-way exchange of information between the AGCS and the control system, land speed and position of the emergency aircraft landing apparatus on a runway with speed and flight path of the aircraft based on the information received from the AGCS onboard the aircraft, and
   the land speed of the emergency aircraft landing apparatus land speed information is configured to be presented to a pilot of the aircraft for information and manual override of automatic synchronization of aircraft speed with the land speed of the emergency aircraft landing apparatus.

2. The apparatus of claim 1 wherein the computer program instructions further comprise instructions executable by the processor, responsive to the automatic coupling, for:
   receiving aircraft information, the aircraft information comprising one or more of aircraft speed, fuselage pitch and roll information, flight path angle, aircraft glide slope, wind speed, and flight path direction information; and
   responsive to receiving the fuselage pitch and roll information, automatically configuring pitch and lateral angling of components of the support structure to accommodate pitch and lateral angle of the aircraft.

3. The apparatus of claim 1:
   wherein the aircraft information further comprises an override command, and
   responsive to receiving an override command from the AGCS, automatically synchronizing one or more of apparatus position, land speed, orientation, support structure pitch, and support structure lateral angle to correspond with information associated with the override command.

4. The apparatus of claim 1 wherein the computer program instructions for automatically coupling further comprise instructions executable by the processor for:
   (a) interfacing with an application programming interface exposed by the AGCS on the aircraft;
   (b) receiving, responsive to the interfacing, flight data from the aircraft; and
   (c) mapping at least a subset of the flight data to characteristics associated with the apparatus, the characteristics comprising land speed, travel direction, and position.

5. The apparatus of claim 1 wherein the AGCS is an autopilot system.

6. The apparatus of claim 1 wherein the automatic coupling and communications of the control system further comprise communicating wirelessly with one or more communications interfaces of the AGCS.

7. The apparatus of claim 1 wherein the computer program instructions further comprise instructions executable by the processor for communicating apparatus land speed information to the AGCS to synchronize aircraft speed with the apparatus land speed.

8. An emergency aircraft landing apparatus, the apparatus comprising: a support structure for a fuselage and wings of an aircraft; and a control system, the control system comprising:
   a processor; and
   a memory operatively coupled to the processor, the memory comprising computer program instructions executable by the processor to perform operations comprising:
      automatically coupling to an exposed interface on the aircraft to initiate a two-way exchange of information between an automated Aircraft Guidance and Control System ("AGCS") onboard the aircraft, and the control system; and
      synchronizing, responsive to the two-way exchange of information between the AGCS and the control system, speed and position of the emergency aircraft landing apparatus on a runway with speed and flight path of the aircraft; wherein the computer program instructions further comprise instructions executable by the processor for communicating apparatus land speed information to the AGCS to synchronize aircraft speed with the apparatus land speed; and
   the apparatus land speed information is configured to be presented to a pilot of the aircraft for information and manual override of automatic synchronization of aircraft speed with the apparatus land speed.

9. The apparatus of claim 8 wherein the presentation is visual and audio presentation.

10. The apparatus of claim 1 wherein the support structure further comprises an interconnected lattice of cylinders.

11. The apparatus of claim 10 wherein the support structure further comprises electronic sensors operatively linked to the control system to synchronize apparatus land speed with speed of the aircraft at a time of contact with the apparatus.

12. The apparatus of claim 10 wherein the cylinders turn only towards a proximal end of the support structure in a direction of a landing aircraft.

13. The apparatus of claim 10 wherein the cylinders are made of rubber.

14. The apparatus of claim 10 wherein the support structure further comprises a set of aircraft pilot guiding lights.

15. The apparatus of claim 1 wherein the apparatus further comprises at least one propulsion device operatively coupled to the control system.

16. The apparatus of claim 1, further comprising a set of load-absorbing and load-balancing wheels operatively coupled to the underside of the support structure.

17. The apparatus of claim 16 wherein the load-absorbing and load-balancing wheels are mounted to a hydraulic shock absorber.

18. A method comprising:
    establishing a two-way communication link with an airplane;
    receiving airspeed and flight path information from an automated Aircraft Guidance and Control System ("AGCS") onboard the airplane;
    synchronizing speed and position of an emergency landing structure on a runway with the airplane based on the airspeed and flight path information received from the airplane based on the information received from the AGCS onboard the airplane, and
    using the land speed of the emergency aircraft landing apparatus land speed information configured to be presented to a pilot of the aircraft for information and manually overriding of automatic synchronization of aircraft speed with the apparatus land speed of the emergency aircraft landing apparatus.

19. The method of claim 18, further comprising:
    receiving fuselage pitch and roll information from the airplane; and
    configuring a pitch and lateral angle associated with components of the emergency landing structure based on the fuselage pitch and roll information received from the airplane.

20. The method of claim 18 wherein synchronizing land speed and position of an emergency landing structure includes activating a propulsion system to manipulate the land speed of the emergency landing structure.

21. The method of claim 18 wherein synchronizing speed and position of an emergency landing structure includes activating a steering system to manipulate the position of the emergency landing structure.

22. The method of claim 18 wherein establishing a communication link with an airplane includes communicating with an aircraft guidance and control system.

23. The method of claim 18 wherein the airspeed and flight path information are received from the airplane by a control system contained in the emergency landing structure.

\* \* \* \* \*